United States Patent [19]

Neumann

[11] Patent Number: 5,466,006
[45] Date of Patent: Nov. 14, 1995

[54] MOTOR VEHICLE HAVING AN ENGINE WITH A COLLISION ENERGY CONVERSION ARRANGEMENT

[75] Inventor: Joachim Neumann, Braunschweig, Germany

[73] Assignee: Volkswagen AG, Wolfsburg, Germany

[21] Appl. No.: 166,537

[22] Filed: Dec. 14, 1993

[30] Foreign Application Priority Data

Dec. 17, 1992 [DE] Germany ............ 42 42 711.8

[51] Int. Cl.⁶ .................................................. B62D 21/15
[52] U.S. Cl. ........................................ 280/784; 180/291
[58] Field of Search .................... 280/784, 781; 180/274, 271, 291

[56] References Cited

U.S. PATENT DOCUMENTS

| | | | |
|---|---|---|---|
| 3,633,934 | 1/1972 | Wilfert | 280/784 |
| 3,638,748 | 2/1972 | Tixier | 280/784 |
| 4,181,192 | 1/1980 | Danckert | 180/274 |
| 4,795,189 | 1/1989 | Vollmer et al. | 180/274 |
| 4,823,905 | 4/1989 | Piech | 180/274 |
| 5,076,389 | 12/1991 | Goor | 280/784 |
| 5,224,574 | 7/1993 | Thum | 280/777 |

FOREIGN PATENT DOCUMENTS

| | | | |
|---|---|---|---|
| 2213725 | 11/1972 | Germany . | |
| 8906617 | 7/1989 | WIPO | 180/274 |

*Primary Examiner*—Eric D. Culbreth
*Attorney, Agent, or Firm*—Brumbaugh, Graves, Donohue & Raymond

[57] ABSTRACT

A motor vehicle engine is restrained by a coupling arrangement attached near the free ends of longitudinal chassis frame members from collision-produced relative motion of the engine toward the passenger compartment and kinetic energy deformation conversion takes place in the longitudinal frame members.

6 Claims, 1 Drawing Sheet

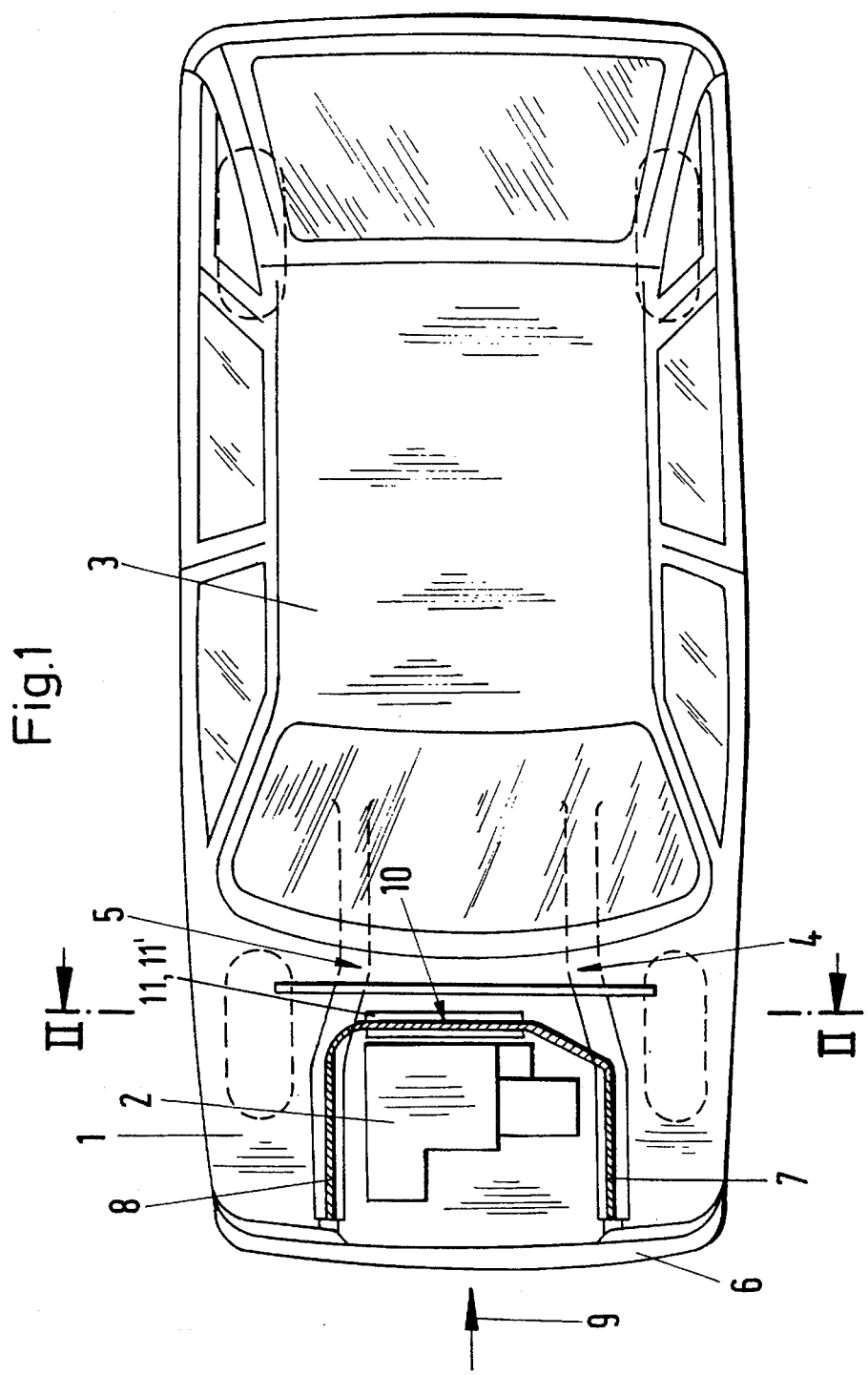
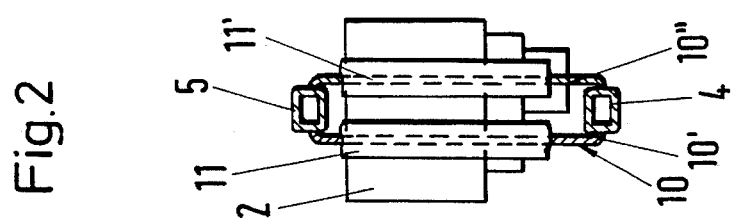

MOTOR VEHICLE HAVING AN ENGINE WITH A COLLISION ENERGY CONVERSION ARRANGEMENT

BACKGROUND OF THE INVENTION

This invention relates to motor vehicles having collision energy conversion arrangements.

Conventionally, the structure of the end portion of a motor vehicle in which the motor vehicle engine is located includes the free ends of two laterally-spaced longitudinal frame members of the chassis extending away from the passenger compartment, to which a transverse bumper is attached. When force is applied to the bumper in a collision, kinetic energy is converted into work of deformation of the longitudinal frame members, for example, a bellows-like deformation, and a consequent reduction in the length of the longitudinal members. This conventional collision energy-absorbing construction presents difficulties, however, if there is a so-called pillar impact, especially in the neighborhood of the central longitudinal plane of the vehicle, i.e., a locally-concentrated impact on the bumper between its supports at the ends of the longitudinal members because, in that case, the bumper, and a radiator that may be positioned behind it, will be greatly deformed. This is especially dangerous because there will then be the danger of displacement of the engine toward the passenger compartment, invading particularly the leg room of the occupants.

German Offenlegungsschrift No. 22 13 725 discloses a motor vehicle that includes an energy-absorbing arrangement between a part of the powertrain connected to the engine and the passenger compartment. This energy-absorbing arrangement is positioned essentially below the passenger compartment and is accommodated by appropriate conformation of the floorplate of the vehicle. Assuming that a bumper suspension also requires energy-absorbing devices not disclosed in that document, this known vehicle requires a considerable additional cost to provide for the absorption of collision-impact kinetic energy of the vehicle engine.

SUMMARY OF THE INVENTION

Accordingly, it is an object of the present invention to provide a motor vehicle having an engine with a collision energy conversion arrangement which overcomes the disadvantages of the prior art.

Another object of the invention is to provide a motor vehicle energy conversion arrangement in which the absorption of kinetic energy from the engine by motion relative to the vehicle body resulting from a collision is achieved with minimal additional cost.

These and other objects of the invention are attained by providing a coupling arrangement positioned between the engine of the motor vehicle and the longitudinal frame members of the vehicle which are arranged to absorb kinetic energy by longitudinal deformation in an end collision of the vehicle, whereby the coupling arrangement is adapted to withhold the engine during movements toward the passenger compartment.

Thus, the invention makes use of deformation members of the vehicle that are present in any event, i.e., the end portions of longitudinal frame members near the engine which serve for conversion of impact forces received by the bumper, to provide energy conversion during relative motion between the engine and the vehicle body.

BRIEF DESCRIPTION OF THE DRAWING

Further objects and advantages of the invention will be apparent from a reading of the following description in conjunction with the accompanying drawing, in which FIG. 1 is a schematic top view illustrating a representative embodiment of a passenger vehicle arranged in accordance with the invention; and FIG. 2 is a sectional view taken along the lines II—II of FIG. 1 and looking in the direction of the arrows.

DESCRIPTION OF PREFERRED EMBODIMENTS

In the typical embodiment of the invention shown in the drawings, a motor vehicle has a front end portion 1 with a transversely-mounted engine 2. The front end portion 1 adjoins a passenger compartment 3 in the usual manner. The chassis for the vehicle includes two longitudinally-extending frame members, only the front portions 4 and 5 of the members adjoining the engine 2 being shown in FIG. 1. Between the front portions 4 and 5, as seen in the top view, the engine 2 is mounted. The front portions of the longitudinal frame members 4 and 5 also support a conventional transverse bumper 6 at their front ends 7 and 8, as seen in FIG. 1. These front ends of the members 4 and 5 are arranged for collision-impact energy conversion in a conventional manner so that, upon axial impact on the ends 7 and 8, they will be reduced in length, for example, by bellows-like deformation. A typical longitudinal vehicle frame member supporting a bumper and arranged for deformation in response to a collision impact is described and illustrated in U.S. Pat. No. 5,224,574, the disclosure of which is incorporated herein by reference.

In case of a pillar impact near the center of the bumper 6 more or less toward the midportion of the engine 2 as indicated by the arrow 9, there is not so much a deformation of the ends 7 and 8 of the longitudinal frame members as a sharp local bending of the bumper 6 toward the engine 2 and the passenger compartment 3. This results in relative motion of the engine 2 toward the passenger compartment 3, which may cause injury to the occupants in the front seat.

To combat this hazard, the illustrated embodiment includes a coupling arrangement 10 comprising, as best seen in FIG. 2, a series of adjacent force-transmitting devices such as straps or cables 10', 10" extending between the engine 2 and the front ends of the end portions 7 and 8 of the longitudinal frame members. In this example, as shown in the drawings, the coupling arrangement 10 does not terminate at the engine 2, but extends behind it so as to be interposed between the engine and the passenger compartment. Care is taken to assure that, during normal collision-free operation, there are sufficient clearances between the coupling arrangement 10 and the engine 2 so that vibrations will not wear out the straps, cables, or other elements of the coupling arrangement 10 and, furthermore, so that the coupling arrangement will not transmit any noise into the vehicle body.

In the embodiment shown, the coupling arrangement 10 includes several straps or cables 10', 10" located one above another to provide a secure restraint for the engine 2 in the event of a collision, each strap or cable being enclosed in a tubular or hose-like jacket 11, 11'.

The use of one or more cables or straps or, alternatively, a net for the coupling arrangement 10 is especially advantageous inasmuch as such a cable, strap or net, while adding little weight to the vehicle, can transmit relatively high stresses and can readily conform its shape to any contour.

With minimal cost, the invention thus provides a motor vehicle in which the engine is effectively restrained from relative motion toward the passenger compartment following a collision by a coupling arrangement which is attached near the ends of the longitudinal frame members, so that the collision forces tending to move the engine toward the passenger compartment are transmitted to the longitudinal frame members in compression and thus produce an energy-absorbing deformation thereof.

Although the invention has been described herein with reference to specific embodiments, many modifications and variations therein will readily occur to those skilled in the art. Accordingly, all such variations and modifications are included within the intended scope of the invention.

I claim:

1. A motor vehicle comprising a vehicle having a passenger compartment, an end portion adjacent to the passenger compartment and longitudinally-extending frame members having deformable end regions within the end portion of the vehicle, the deformable end regions being adapted to absorb by length reduction kinetic energy resulting from a longitudinally-directed collision impact, an engine within the end portion of the vehicle, and coupling means extending between the engine and the passenger compartment and affixed to the deformable end regions of the longitudinally-extending frame members forwardly of the engine for coupling the engine and the deformable end regions to transmit kinetic energy resulting from collision impact from the engine to the deformable end regions of the longitudinally-extending frame members to cause longitudinal deformation thereof.

2. A motor vehicle according to claim 1 wherein the coupling means comprises a plurality of flexible force-transmitting members.

3. A motor vehicle according to claim 2 wherein the flexible force-transmitting members extend from the end regions of the longitudinally-extending frame members to the side of the engine adjacent to the passenger compartment.

4. A motor vehicle according to claim 2 wherein the flexible force-transmitting members are normally maintained in spaced relation to the engine in the absence of collision-related forces.

5. A motor vehicle according to claim 1 wherein the coupling means comprises a plurality of vertically-spaced force-transmitting members.

6. A motor vehicle comprising a vehicle having a passenger compartment, an end portion adjacent to the passenger compartment and longitudinally-extending frame members having deformable end regions within the end portion of the vehicle, the deformable end regions being adapted to absorb by length reduction kinetic energy resulting from a longitudinally-directed collision impact, an engine within the end portion of the vehicle, and coupling means extending between the engine and the passenger compartment and affixed to the deformable end regions of the longitudinally-extending frame members for coupling the engine and the deformable end regions to transmit kinetic energy resulting from said collision impact from the engine to the deformable end regions of the longitudinally-extending frame members, wherein the coupling means comprises a plurality of flexible force-transmitting members and including at least one tubular jacket surrounding the flexible force-transmitting members.

* * * * *